MAGNETIC DEVICE

Filed July 1, 1954

INVENTOR.
Richard L. Whitely
BY Morris A. Rabkin
ATTORNEY 2,951,237
Patented Aug. 30, 1960

2,951,237

MAGNETIC DEVICE

Richard L. Whitely, Haddonfield, N.J., assignor to Radio Corporation of America, a corporation of Delaware Filed July 1, 1954, Ser. No. 440,700
9 Claims. (Cl. 340—174)

This invention relates to digital information handling systems, and particularly to magnetic devices for performing logical and switching functions in such digital systems.

A number of disadvantages have been encountered in the development of vacuum tube circuits for digital computers. These disadvantages include tube failures, large power-supply requirements and large size. To eliminate such disadvantages in certain applications, magnetic systems have been developed that employ magnetic cores made of material having a substantially rectangular hysteresis characteristic. These magnetic systems have the advantages of small size, relatively small power-supply, and relatively long life.

Among such systems that have been developed heretofore are those employing magnetic amplifiers. In such a system, for example, a magnetic amplifier unit is used to perform various storage, logical, and switching functions including the functions of a storage register, a flip-flop, and an "and" circuit.

Another circuit that is basic to digital computers is one that performs the "not" function. That is to say, if there is an input pulse, the "not" circuit produces no output pulse; and if there is no input pulse, an output pulse is produced. The "not" circuit is generally used to perform a variety of logical operation, examples of which are given in the book "High-Speed Computing Devices," McGraw-Hill, 1950, chapter 13. In addition to the "not" function, it is often desirable to have the original or affirmative function (the output the same as the input) present at the same time. It is also desirable to be able to produce the "not" output either at the same time as the input or after a predetermined delay.

Accordingly, it is among the objects of this invention to provide:

(1) A new and improved magnetic device for performing logical and switching functions;

(2) An improved and simple magnetic device for performing logical and switching functions that is reliable in operation;

(3) An improved magnetic device for performing logical operations that is economical in construction;

(4) An improved magnetic device for performing the "not" function that is simple and reliable.

In accordance with this invention, a saturable magnetic core is driven alternately from an initial state of saturation to the opposite state and back to the initial state by means of an electrical circuit. The circuit includes at least one winding linked to the core. Pulses of alternately opposite polarities are applied to the circuit. Means are provided for applying input pulses to the circuit to inhibit those pulses that tend to drive the core from the initial state. An output circuit includes another winding linked to the core and a unilateral impedance. The output circuit produces an output pulse only in the absence of an input pulse and when there is a change of state of the core.

The foregoing and other objects, the advantages and novel features of this invention, as well as the invention itself both as to its organization and mode of operation, may be best understood from the following description when read in connection with the accompanying drawing, in which like reference numerals refer to like parts, and in which.

Figures 1, 2, 3, 4:
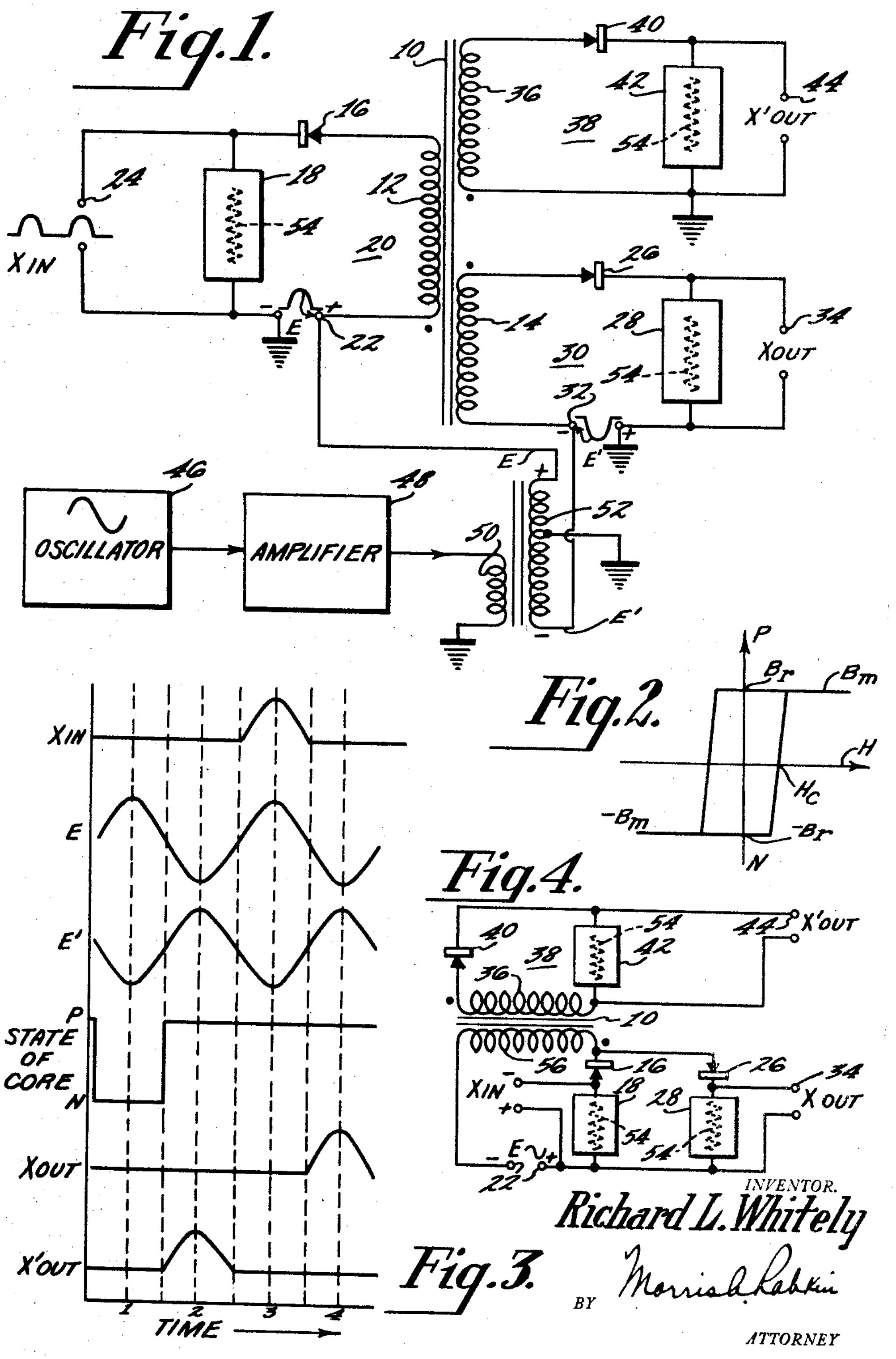
Figure 1 is a schematic circuit diagram of a magnetic device embodying this invention.
Figure 2 is an idealized graph of the hysteresis characteristic of a magnetic core used in the device in Figure 1.
Figure 3 is an idealized graph of waveforms occurring in various portions of the circuit of Figure 1.
Figure 4 is a schematic circuit diagram of another embodiment of this invention.

Referring to Figure 1, a saturable magnetic core 10 is employed that has a substantially rectangular hysteresis characteristic of the type shown in Figure 2. The core material exhibits a high saturation density $B_m$, a high value of residual flux density $B_r$ and a low coercive force $H_c$. Opposite directions of flux in the core 10 are represented by P and N. An electrical circuit is provided for driving the core 10 alternately from the P state to the N state and back to the P state. This circuit includes a first winding 12 and a second winding 14 linked to the core 10. A first diode 16 and a first load impedance 18 are connected in a series circuit 20 with each other and with the first winding 12. A terminal 22, connected to the first winding 12, is employed for applying pulses E of alternately opposite polarities to the series circuit 20. This terminal 22 is called an alternating current (A.-C.) terminal. One of the terminals of the load impedance 18 is connected to a common conductor, indicated by the conventional ground symbol, which also serves as the common ground for the A.-C. pulses E. Input pulses, positive-going with respect to ground, are applied to a terminal 24 connected to the ungrounded terminal of the load impedance 18. A second series circuit 30 has a second diode 26, a second load impedance 28 and the second winding 14 connected in series in a manner similar to the first circuit 20. An A.-C. terminal 32 is connected to the second winding 14 and employed for applying pulses E′ of alternately opposite polarities to the second circuit 30. A terminal of the load impedance 28 is connected to ground. An output terminal 34 is connected to the ungrounded terminal of the second load impedance 28. A third winding 36 is linked to the core 10 and connected in a series circuit 38 with a third diode 40 and third load impedance 42. A terminal of the third load impedance 42 is grounded. A second output terminal 44 is connected to the ungrounded terminal of the third load impedance 42.

The pulses simultaneously applied to the A.-C. terminals 22, 32 of the first and second circuits 20, 30 are of opposite polarities respectively, that is one is positive-going when the other is negative-going. An oscillator 46 is employed for generating pulses of alternately opposite polarities. The oscillator 46 may be of the sine wave type or of any other appropriate type. The oscillator 46 is connected through an amplifier 48 to the primary 50 of a transformer. The transformer secondary 52 has an intermediate tap connected to ground. Opposite polarity terminals on this transformer secondary 52 are respectively connected to the ungrounded A.-C. terminals 22, 32 of the first and second circuits 20, 30. Accordingly, at any time a positive-going pulse is applied to one of the A.-C. terminals 22, 32 a negative-going pulse is applied to the other, as indicated by the letters E and E′ (designating the opposite of E) in Figure 1.

The load impedances 18, 28, 42 may be simple resistances 54 or, alternatively, non-linear impedances such as are described in an article by Ramey in "Transactions of Am. Inst. of Elect. Eng.," January 1953, page 442, Figure 5. The input terminal 24 may be the output terminal of a preceding magnetic device (not shown) with the load impedance 18 of the first circuit 20 acting as the load impedance of the output circuit of the preceding device. In a similar manner, the output terminals 34, 44 may be connected to the inputs of succeeding magnetic devices (not shown). The inputs X*in* are positive-going half sine wave pulses of amplitude substantially equal to a half sine wave applied to the first circuit A.-C. terminals 22. The amplitudes of pulses E, E′ and X*in* are sufficient to provide saturating currents for the core 10 when impressed across the associated windings. Another transformer secondary (not shown) similar to the transformer secondary 52, but having the opposite sense of linkage, may be common to the preceding and succeeding devices (not shown) so that the input pulses X*in* coincide in time with the positive-going pulses E.

The dots adjacent leads of the three windings 12, 14, 36 indicate the relative directions of winding in accordance with the usual transformer convention. The relative polarities of the first and second windings 12, 14 and diode 16, 26 are such that the diodes 16, 26 only pass positive-going pulses E, E′ and block negative-going pulses, as shown in Figure 1. The relative polarities of the third winding 36 and diode 40 are such that a reversal of flux direction in the core 10 due to a current pulse in the first winding 12 in the forward direction of diode 16 caused by voltage E induces a pulse in third winding 36 that is blocked by the high back impedance of the third diode 40. However, a reversal of flux direction due to a current pulse in the second winding 14 in the forward direction of diode 26 caused by voltage E′ induces a pulse that is passed by the low forward impedance of the third diode 40.

The wave forms in Figure 3 illustrate the operation of the circuit in Figure 1. The case first considered is that of no input pulse X*in*. The polarities of the A.-C. pulse E, E′ for the first half-cycle are as indicated in Figure 1, and in Figure 3 in the time interval 1. The core 10 is initially in the P state of substantial saturation. The first pulse applied to the first circuit A.-C. terminal 22 is positive-going and is passed by the diode 16. The direction winding 12 is such that the core is driven to the N state of saturation. The reversal of flux direction induces a voltage pulse in the second winding 14 that is of opposite polarity to the negative-going pulse E′. Thus, in the first half-cycle there is substantially no current flow in the second winding. During the second half cycle, time interval 2, the pulse polarities at the A.-C. terminals 22, 32 are reversed. Conduction in the first circuit 20 is blocked by the diode 16. The second diode 26 passes the positive-going pulse E′ which energizes the second winding 14 to return the core to the P state. The voltage drop across the second winding 114 during the change in flux direction to P is substantially equal to that of the pulse E′, since the impedance of the load 28 is relatively small. Thus, the voltage at the output terminal 34 is substantially unchanged.

When the core 10 was initially driven to the N state by the first half cycle pulse in the first winding 12, a voltage is induced in the third winding 36. However, this induced voltage is of such polarity that it is blocked by the high back impedance of the third diode 40. Thus, there is no output pulse produced at the terminal 44. However, when the core 10 is returned to its initial P state by the second half cycle pulse in the second winding 14, a pulse is induced in the third winding 36 which is passed by the third diode 40 and applied across the third load impedance 42. Thus, there is an output pulse X′*out*. Accordingly, in the absence of an input pulse, X*in*, there is no output pulse, X*out*, from the second circuit 30, but there is an output pulse from the third circuit, X′*out*.

On the next cycle, if there is an input pulse X*in*, time interval 3, the positive-going pulse E on the first circuit A.-C. terminals 22 is opposed by this input pulse. Accordingly, the A.-C. pulse E is inhibited and the core 10 remains in the initial P state. In the next half cycle, time interval 4, the A.-C. pulse E′ in the second circuit 30 is in the direction to saturate the core 10 in the P direction. However, since the core is already in the P direction, the second winding 14 offers very little impedance to the second load impedance 28. As a result substantially all of the voltage E′ appears across the impedance 28, and there is an output pulse, X*out*, at the terminal 34. Since the A.-C. pulse E′ does not reverse the flux direction of the core 10 there is no pulse induced in the third winding 36. Thus, there is no output pulse, X′*out* at terminal 44.

Thus, X*out* is the same as X*in*, and X′*out* is the opposite or negation of X*in*. The function X′ may be provided by the same core used for providing X. Both X and X′ may be obtained at the same time with a minimum of extra equipment, namely a winding 36 and a diode 40.

In Figure 4, a modified form of this invention is shown, in which a single input winding 56 is used to alternately change the state of the core 10 from P to N and back to P. Parts similar to those described above are referenced by the same numerals. The input winding 56 is connected in a series circuit with the first diode 16, the first load impedance 18 and the A.-C. terminals 22. The first diode 16 is poled to pass the positive-going A.-C. pulses E. Connected in shunt with the first diode 16 and first load impedance 18 is the series combination of the second diode 26 and second load impedance 28. The second diode 26 is poled to pass the negative-going pulses E. The "not" output circuit 38 is the same as the third circuit 38 shown in Figure 1 except for the polarity of the output winding 36. As indicated by the dots next to the leads of the windings, the relative polarities of windings 36 and 56 in Figure 4 are the reverse of windings 36 and 12 in Figure 1.

In the absence of an input pulse, the first half-cycle A.-C. pulse, which is positive-going, is passed through the first diode 16 to reverse the state of the core from P to N. The second A.-C. pulse, which is negative-going, restores the core to the P state with the current path being through the second diode 26. Substantially all of the voltage drop is across the input winding 56, in this case, so that there is no output pulse X*out*. If there is an input pulse X*in* on the first half cycle, the positive-going A.-C. pulse E is blocked, and the flux direction of the core remains unchanged at P. The second half-cycle A.-C. pulse through diode 26 is presented with negligible impedance in the input winding 56 so that substantially the full voltage E is applied across the second load impedance to produce an output pulse, X*out*. As in the circuit of Figure 1, an output pulse is induced in the output winding 36, in the absence of an input pulse X*in*, when the flux direction of the core 10 is reversed by the A.-C. pulse. In the embodiment of Figure 4, however, the output winding 36 polarity and diode 40 polarity are such that an output pulse X′*out* is produced when the state of the core is reversed during the first half cycle by the positive-going pulse E, and not during the second half cycle. Thus, X′*out* occurs at the same time as X*in* without a delay of a half cycle. Accordingly, the "not" function X′ may be provided without delay or with delay, as desired, by appropriate choice of polarities for the output winding 36 and diode 40.

It is seen from the above description of this invention that an improved magnetic device for providing logical and switching functions is provided. The circuit is simple, reliable in operation and economical in construction.

What is claimed is:

1. A magnetic device comprising a single magnetic core having a substantially rectangular hysteresis characteristic, circuit means for alternately applying magnetomotive forces opposite polarities to said core to drive said core alternately from an initial magnetic state and back to said initial state, said circuit means including a first winding linked to said core, and means for applying first pulses to said first winding, means for applying input pulses to said circuit means to inhibit those of said first pulses tending to drive said core from said initial state, and means responsive during a change of state of said core by said first input pulses for producing output pulses, said output pulse producing means including an output winding linked to said core.

2. A magnetic device as recited in claim 1, wherein said output pulse producing means further includes a unilateral impedance connected in series with said output winding, the relative directions of linkage of said first and said output windings and the polarity of said unilateral impedance being such as to produce said output pulses only when said core is driven back to said initial state after a half cycle delay after the absence of said input pulses.

3. A magnetic device as recited in claim 1, wherein said output pulse producing means further includes a unilateral impedance connected in series with said output winding, the relative directions of linkage of said first and said output windings and the polarity of said unilateral impedance being such as to produce said output pulses only when said core is driven from said initial state during the same half cycles as those in which said input pulses are absent.

4. A magnetic device as recited in claim 1, wherein said circuit means includes another winding linked to said core, and means for applying second pulses to said another winding tending to drive said element back to said initial state.

5. A magnetic device as recited in claim 1, wherein said means for applying first pulses to said first winding includes means for alternately applying pulses of opposite polarities to said first winding to drive said core from said initial state and back to said initial state.

6. A magnetic device as recited in claim 1, and further comprising additional means coupled to said circuit means for deriving output pulses only upon said input pulses being applied to said circuit means.

7. A magnetic device comprising a single saturable magnetic core having a substantially rectangular hysteresis characteristic, circuit means for alternately applying magnetomotive forces of opposite polarities to said core to drive said core alternately from an initial state and back to said initial state, said circuit means including a first and a second winding linked to said core, and means for alternately applying first pulses of opposite polarities to said first and second windings with pulses of opposite polarities being simultaneously applied to one and the other of said windings, means for applying input pulses to said circuit means to inhibit those of said first pulses tending to drive said core from said initial state, means responsive during a change in state of said core by said first pulses for producing output pulses for producing output pulses, said output pulse producing means including an output winding, a unilateral impedance, and a load impedance all connected in series, and load means coupled to one of said first and second windings for deriving output pulses only upon said input pulses being applied to said circuit means.

8. A magnetic device comprising a single saturable magnetic core having a substantially rectangular hysteresis characteristic, circuit means for alternately applying magnetomotive forces of opposite polarities to said core to drive said core alternately from an initial state and back to said initial state, said circuit means including a first winding linked to said core, and means for alternately applying first pulses of opposite polarities to said first winding, means for applying input pulses to said circuit means to inhibit those of said first pulses tending to drive said core from said initial state, load means coupled to said first winding for deriving output pulses only upon said input pulses being applied to said circuit means, and means responsive during a change of state of said core by said first input pulses for producing output pulses, said output pulse producing means including an output winding, a unilateral impedance, and a load impedance all connected in series.

9. A magnetic device comprising a single magnetic core having a substantially rectangular hysteresis curve and two directions of remanent flux, circuit means for alternately applying magnetomotive forces of opposite polarities to said core to drive said core from one remanent flux direction to the other and back to said one direction, said circuit means including a first winding linked to said element, and means for applying first voltage pulses to said first winding, means for applying input voltage pulses to said circuit means to block said first voltage pulses tending to drive said core to said other direction, and means responsive during a change of state of said core by said first input pulses for producing output pulses, said output pulse producing means including an output winding linked to said element, and a unilateral impedance connected in series with said output winding.

References Cited in the file of this patent

UNITED STATES PATENTS

| | | |
|---|---|---|
| 2,709,798 | Steagall | May 31, 1955 |
| 2,717,965 | Ramey | Sept. 13, 1955 |
| 2,747,109 | Montner | May 22, 1956 |
| 2,766,420 | Ramey | Oct. 9, 1956 |

OTHER REFERENCES

Publication, Electronic Engineering, May 1954, pp. 180–185.